United States Patent
Baburao et al.

(10) Patent No.: US 9,314,734 B2
(45) Date of Patent: Apr. 19, 2016

(54) WASH WATER METHOD AND SYSTEM FOR A CARBON DIOXIDE CAPTURE PROCESS

(75) Inventors: Barath Baburao, Knoxville, TN (US); Michael W. Pontbriand, Yonore, TN (US)

(73) Assignee: ALSTOM Technology Ltd, Baden (CH)

( * ) Notice: Subject to any disclaimer, the term of this patent is extended or adjusted under 35 U.S.C. 154(b) by 155 days.

(21) Appl. No.: 12/985,613

(22) Filed: Jan. 6, 2011

(65) Prior Publication Data

US 2011/0168020 A1  Jul. 14, 2011

Related U.S. Application Data

(60) Provisional application No. 61/294,971, filed on Jan. 14, 2010.

(51) Int. Cl.
 *B01D 53/14* (2006.01)
 *B01D 53/18* (2006.01)

(52) U.S. Cl.
 CPC ............ *B01D 53/1475* (2013.01); *B01D 53/18* (2013.01); *B01D 2257/504* (2013.01); *Y02C 10/04* (2013.01); *Y02C 10/06* (2013.01)

(58) Field of Classification Search
 None
 See application file for complete search history.

(56) References Cited

U.S. PATENT DOCUMENTS

| | | | |
|---|---|---|---|
| 3,435,590 A | 4/1969 | Smith | |
| 4,589,889 A * | 5/1986 | Spencer | 95/174 |
| 4,799,941 A * | 1/1989 | Westermark | 95/199 |
| 5,318,758 A | 6/1994 | Fujii et al. | |
| 5,378,442 A | 1/1995 | Fujii et al. | |
| 5,405,590 A * | 4/1995 | Macedo et al. | 423/210 |
| 6,579,508 B2 * | 6/2003 | Ishida | 423/220 |
| 6,784,320 B2 * | 8/2004 | Mimura et al. | 564/497 |
| 6,800,120 B1 * | 10/2004 | Won et al. | 96/234 |
| 2003/0045756 A1 * | 3/2003 | Mimura et al. | 564/498 |
| 2009/0148371 A1 * | 6/2009 | Reddy et al. | 423/235 |
| 2009/0193970 A1 * | 8/2009 | Iijima | 95/186 |

(Continued)

FOREIGN PATENT DOCUMENTS

| | | |
|---|---|---|
| CN | 101472662 A | 7/2009 |
| RU | 2193441 C2 | 11/2002 |
| WO | WO 2008/108657 | 9/2008 |

OTHER PUBLICATIONS

Google.com search results for definition of "substantially" and google.com definitoni of word "substantially." (Aug. 22, 2014).*

(Continued)

*Primary Examiner* — Cabrena Holecek
(74) *Attorney, Agent, or Firm* — Cynthia W. Flanigan

(57) ABSTRACT

A system and method for recovering a solvent from a decarbonated flue gas in an absorption column, the decarbonated flue gas having had carbon dioxide absorbed and removed by vapor-liquid contact with a carbon dioxide absorbing solution containing the solvent. The system includes an emission control section configured to bring a water stream substantially free of the solvent into contact with the decarbonated flue gas to recover the solvent from the decarbonated flue gas and to form a solvent containing wash water and a reduced solvent containing flue gas and a flue gas cooling section configured to bring cooled wash water into contact with the reduced solvent containing flue gas to cool the reduced solvent containing flue gas and condense water from the decarbonated flue gas thereby forming a cooled flue gas and used wash water.

20 Claims, 2 Drawing Sheets

(56) References Cited

U.S. PATENT DOCUMENTS

2010/0229720 A1* 9/2010 Sonwane et al. .................. 95/46
2011/0041685 A1* 2/2011 Tanaka et al. ..................... 95/16

OTHER PUBLICATIONS

Oxford Dictionaries pdf definition of substantially, accessed Mar. 2015.*
Oxford Dictionaries pdf definition of minimal, accessed Apr. 2015.*
PCT International Search Report and the Written Opinion of the International Searching Authority, dated Apr. 12, 2011 (PCT/US2011/020631.
State Intellectual Property Office of P.R. China—First Office Action corresponding to Chinese Patent Application No. 201180006185.1, dated Dec. 23, 2013.
Official Decision of Grant for RU Appln. No. 2012131551 dated Apr. 17, 2015.

* cited by examiner

WASH WATER METHOD AND SYSTEM FOR A CARBON DIOXIDE CAPTURE PROCESS

CROSS REFERENCE TO RELATED APPLICATIONS

This application claims priority to U.S. Provisional Patent Application No. 61/294,971 filed on Jan. 14, 2010, the contents of which are incorporated in their entirety herein.

TECHNICAL FIELD

The present disclosure relates to a water wash system for a carbon dioxide ($CO_2$) capture process. More particularly, the present disclosure relates to a method and system of washing flue gas after $CO_2$ absorption to reduce solvent emissions and maintain water neutrality.

BACKGROUND

From the point of view of air pollution control and environmental concerns, there is seen a need to decrease the quantities and concentrations of carbon dioxide ($CO_2$) emissions resulting from the combustion of coal, oil, and other carbon fuels. For this purpose, methods for removing carbon dioxide from the flue gas (also commonly referred to as "exhaust gas") resulting from such combustion are presently being developed. One such method employs absorption of $CO_2$ from flue gases using aqueous solutions of solvents. Examples of solvents include amine-containing solutions. Examples of amines include, but are not limited to, for example, alkanolamine, monoethanolamine and the like, and combinations and/or mixtures thereof, which are hereinafter referred to as "amines" or "amine compounds."

An example of a solvent-based method for removing $CO_2$ with the use of amines is provided in U.S. Pat. No. 5,318,758, which is incorporated by reference herein in its entirety. The '758 patent proposes a method which performs decarbonation by using an aqueous solution of an amine compound as a solution for absorbing carbon dioxide from the flue gas within an absorber column.

In general, a solvent-based method for removing $CO_2$ from a flue gas includes a flue gas supplied by a combustion gas supply blower, which is cooled by a cooling tower, and then fed to an absorption column. In the $CO_2$ absorption section of the absorption column, the fed flue gas is brought into countercurrent contact with an absorbing solution supplied through an absorbing solution supply port via at least one nozzle. As a result, $CO_2$ in the flue gas is absorbed and removed by the absorbing solution. The loaded absorbing solution, which has absorbed $CO_2$, is sent to a regeneration tower by the absorbing solution discharge pump through an absorbing solution discharge port. In the regeneration tower, the loaded absorbing solution is regenerated, and fed again to the absorption tower through the absorbing solution supply port.

Most solvent-based $CO_2$ capture processes involve an exothermic reaction between the solvent and the flue gas, which leads to a temperature profile in the absorption column. Depending upon the process parameters, the maximum temperature (also known as "temperature bulge") in the column could be in the top, bottom or middle section of the absorber column Owing to this temperature increase, there are some solvent losses that occur in the process along the column. These solvent losses occur mainly through the decarbonated flue gas that is leaving the top of the absorber column.

In a $CO_2$ capture process with a chemical solvent, such as amines, a wash section may be included on top of the absorber column to reduce this emission loss. The decarbonated flue gas contacts the wash water in the wash section on top of the absorber, which captures some of the solvent from the gas phase and is recovered in the liquid phase. This recovered solvent in the liquid phase can be either used directly in the $CO_2$ absorption process or sent to a solvent make-up section.

Depending upon the gas separation processes upstream of the $CO_2$ absorber column, the flue gas entering the absorber column is mostly saturated. In order to maintain the solvent capacity, it is important to run the process without any solvent losses as well as water accumulation. Any accumulation of excess water in the absorber column will lead to the dilution of the solvent concentration, which will impact its mass transfer characteristics and variation of partial pressures along the column. Hence it is important to ensure that the amount of water entering and leaving the process is very close, which is called "water neutrality". Previously known and described wash sections have not provided reduced solvent neutrality. The processes and systems described herein are seen to address at least these issues.

SUMMARY

According to aspects illustrated herein, there is provided a method for recovering a solvent from a decarbonated flue gas in a water wash section of an absorption column, the decarbonated flue gas having had carbon dioxide absorbed and removed by vapor-liquid contact with a carbon dioxide absorbing solution containing the solvent in the absorption column, the method comprising: bringing a water stream substantially free of the solvent into counter-current contact with the decarbonated flue gas in an emission control section of the absorption column to recover the solvent from the decarbonated flue gas to form a solvent containing wash water and a reduced solvent containing flue gas; and bringing a cooled wash water into counter-current contact with the reduced solvent containing flue gas in a flue gas cooling section of the absorption column to cool the reduced solvent containing flue gas, thereby forming a cooled flue gas and a used wash water.

According to another aspect illustrated herein, there is provided a system for recovering a solvent from a decarbonated flue gas in an absorption column, the decarbonated flue gas having had carbon dioxide absorbed and removed by vapor-liquid contact with a carbon dioxide absorbing solution containing the solvent, the system comprising: an emission control section configured to bring a water stream substantially free of the solvent into contact with the decarbonated flue gas to recover the solvent from the decarbonated flue gas and to form a solvent containing wash water and a reduced solvent containing flue gas; and a flue gas cooling section configured to bring cooled wash water into contact with the reduced solvent containing flue gas to cool the reduced solvent containing flue gas and condense water from the decarbonated flue gas thereby forming a cooled flue gas and used wash water.

The above described and other features are exemplified by the following figures and detailed description.

BRIEF DESCRIPTION OF THE DRAWINGS

Referring to the drawings, wherein like items are numbered alike in the various Figures.

DETAILED DESCRIPTION

Figure 1:
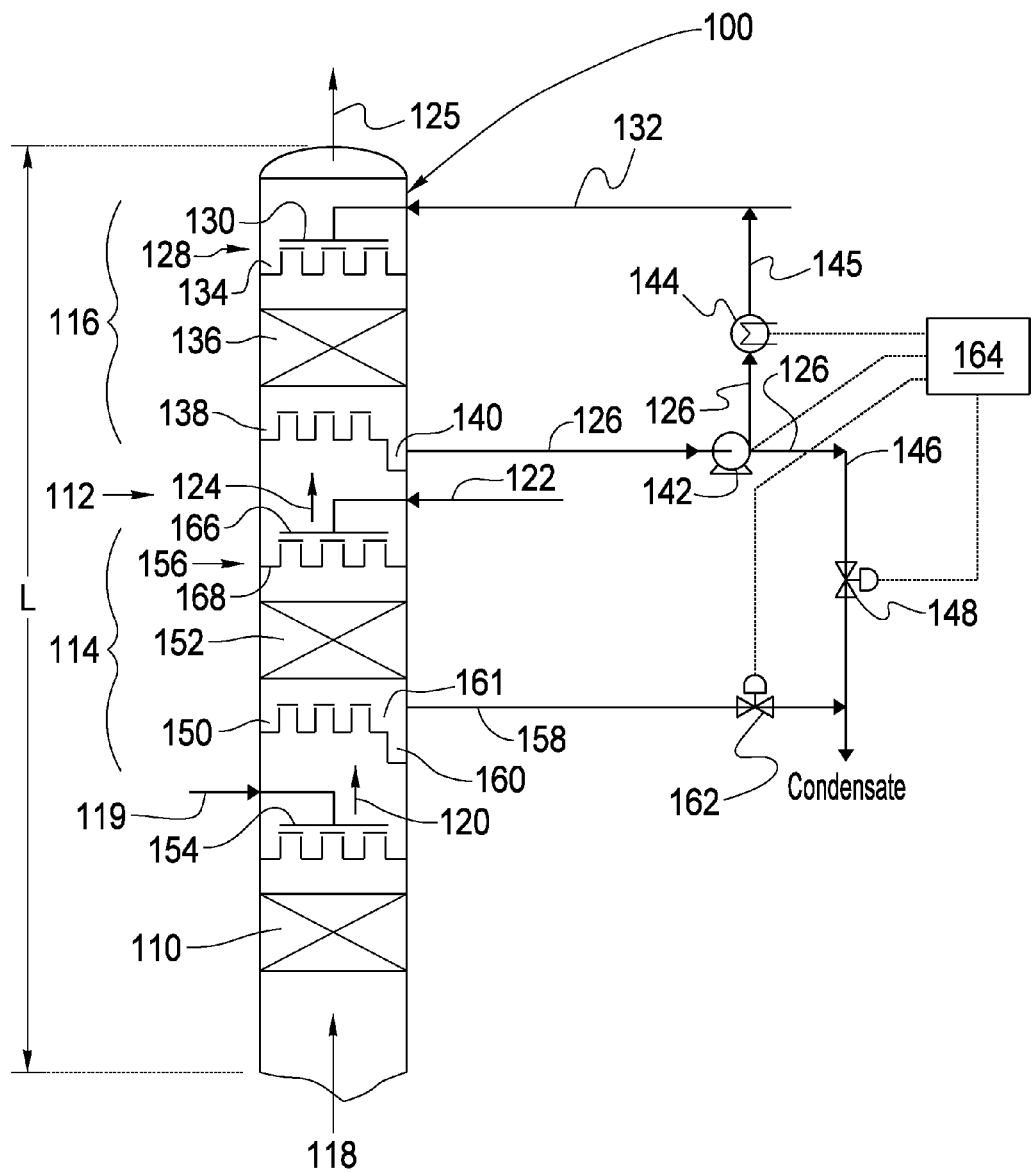
FIG. 1 depicts a $CO_2$-absorption column having a water wash section in accordance with an embodiment described herein.

FIG. 1 illustrates an absorption column 100 having at least one absorber bed 110 and a water wash section 112. In this arrangement, the water wash section 112 is divided in to at least two sections, namely, an emission control section 114 and a flue gas cooling section 116.

A flue gas 118 provided to the absorption column 100 and ascends at least a portion of a length L of the absorption column. In at least one absorber bed 110, carbon dioxide ($CO_2$) present in the flue gas 118 is absorbed by contacting the flue gas with a $CO_2$-absorbing solution 119 in a countercurrent fashion. In one embodiment, the $CO_2$-absorbing solution 119 is an amine-containing solution. Examples of amines include, but are not limited to, for example, alkanolamine, monoethanolamine and the like, and combinations and/or mixtures thereof, which are hereinafter referred to as "amines" or "amine compounds." The amine-containing solution may also include a promoter to enhance the chemical reaction kinetics involved in the capture of CO2 by the ammoniated solution. For example, the promoter may include an amine (e.g. piperazine) or an enzyme (e.g., carbonic anhydrase or its analogs), which may be in the form of a solution or immobilized on a solid or semi-solid surface.

Removal of $CO_2$ from the flue gas 118 creates a decarbonated flue gas 120. The decarbonated flue gas 120 contains, for example, an amount of the $CO_2$-absorbing solution in vapor form, (hereinafter "a solvent"). For example, the decarbonated flue gas 120 may contain an amount of amine solvent in vapor form.

To absorb, and thereby remove or reduce the amount of the solvent in the decarbonated flue gas 120, the decarbonated flue gas 120 ascends at least a portion of the length L of the absorption column 100 and encounters the water wash section 112. As shown in FIG. 1, the decarbonated flue gas 120 encounters the emission control section 114, which facilitates the reduction or removal of the solvent from the decarbonated flue gas.

The emission control section 114 includes a water stream 122 (also referred to as "make-up water"). The water stream 122 is relatively free of contaminants and impurities, such as, for example, the solvent, and facilitates the absorption of the solvent from the decarbonated flue gas 120. While not shown on the figure, it is contemplated that the water stream 122 can be used from anywhere within the process itself, e.g., regenerator condensate, and the like.

The decarbonated flue gas 120 comes into contact with water stream 122 in a countercurrent fashion as the decarbonated flue gas ascends up at least a portion of the length L of the absorption column 100 and the water stream descends at least a portion of the absorption column.

Since the water stream 122 is relatively free of contaminants and impurities, the concentration gradient of solvent (e.g., amine) between the decarbonated flue gas 120 and the water stream is high, resulting in solvent absorption from the decarbonated flue gas and formation of a reduced solvent containing flue gas 124. The reduced solvent containing flue gas 124 leaving the emission control section 114 is almost free of any solvent, therefore vapor phase solvent losses are reduced. Owing to this high concentration gradient, the water circulation rate for the emission control section 114 is very low. This in turn affects the temperature of the flue gas 124 exiting the emission control section 114.

There are minimal changes between the entrance temperature of the decarbonated flue gas 120 and the exit temperature of the reduced solvent containing flue gas 124 in the emission control section 114. Accordingly, to cool the temperature of the reduced solvent containing flue gas 124, and to remove excess water, therefrom, the flue gas 124 is provided to the flue gas cooling section 116, which contacts the flue gas 124 with water to form a cooled flue gas 125. Maintenance of water neutrality, i.e., keeping the amount of water leaving the absorption column 100 the same as or similar to the amount of water introduced to the absorption column, is also facilitated by the flue gas cooling section 116. The flue gas 124 is provided to the flue gas cooling section 116 by ascending at least a portion of the length L of the absorption column 100.

In the flue gas cooling section 116, the solvent emissions control is very minimal, and therefore, the used wash water 126 from the flue gas cooling section 116 may be used elsewhere in the absorption column 100 or within the overall process of removing contaminants from a flue gas.

Still referring to FIG. 1, in one embodiment the flue gas cooling section 116 includes a liquid distributor 128. The liquid distributor 128 may include, for example, a manifold 130 having nozzles or the like to disperse a wash water 132 within the absorption column 100, and a liquid distribution plate 134 or the like, to further distribute the wash water within the absorption column.

The flue gas cooling section 116 may also include a mass transfer device 136, such as packing trays, plates, or the like, disposed beneath the liquid distributor 128. As shown in FIG. 1, the mass transfer device 136 is positioned beneath the liquid distribution plate 134. The flue gas cooling section 116 may also include a collection device 138, such as a liquid collector plate, disposed beneath the mass transfer device 136, which acts to collect wash water 132 that has descended at least a portion of the length L of the absorption column 100. The collection device 138 provides the wash water to a sump 140, where the wash water is withdrawn as used wash water 126.

A pump 142 is in fluid communication (e.g., by piping, tubing, ductwork, or the like) with the sump 140 of the collection device 128. The pump 142 facilitates removal of the water collected by the collection device 138 and provided to the sump 140.

A heat exchanger 144 is in fluid communication with the pump 142 and is configured to reduce the temperature of the used wash water 126 to form a cooled liquid 145. As shown in FIG. 1, at least a portion of the cooled liquid 145 is recirculated within the flue gas cooling section 116. In one embodiment, as shown in FIG. 1, the cooled liquid supplements wash water 132 that is provided to the flue gas cooling section 116. The system is not limited in this regarding since it is contemplated that the wash water 132 may consist entirely of the cooled liquid 145.

Continuing to refer to FIG. 1, a branch line 146 is disposed in fluid communication with the pump 142 and the collection device 138. The branch line 146 is arranged so less than all of the used wash water 126 may be cooled and returned to the flue gas cooling section 116. For example, a portion of the used wash water 126 may be provided to the heat exchanger 144, and a portion of the withdrawn liquid may be provided to the branch line 146. In one example, 50% of the used wash water 126 is provided to the heat exchanger 144 and 50% of the used wash water is provided to the branch line 146.

The branch line 146 may include one or more control valves 148 or other flow control devices, to adjust an amount of used wash water 126 removed from the water wash system 112 or to adjust an amount of used wash water that flows through the branch line. The used wash water 126 provided to branch line 146 may be sent to a lean solvent make-up tank (not shown) or to the top of the absorption column 100 (not shown). The used wash water 126, because it contains little to no amine solvent, may also be used elsewhere within the overall flue gas treatment system.

Similar to the flue gas cleaning section 116, the emission control section 114 also includes a collection device 150 for collecting wash water in the emission control section. The collection device 150 is disposed between a material transfer device 152 and an absorbing solution distributor 154. The absorbing solution distributor 154 facilitates the distribution of the $CO_2$-absorbing solution 119 throughout the absorber bed 110. The $CO_2$-absorbing solution 119 contacts the flue gas 118 in a countercurrent manner as the flue gas 118 ascends at least to a portion of a length L of the absorption column 100 and the $CO_2$-absorbing solution travels in an opposite direction.

Still referring to the emission control section 114 in FIG. 1, a liquid distributor 156 (also referred to as a fluid distribution device) is disposed within the absorption column 100 and is in fluid communication with the source of the water stream 122. The liquid distributor 156 is configured to distribute the water stream 122 within the emission control section 114.

A branch line 158 is disposed in fluid communication with a sump 160 of the collection device 150. The branch line 158 may be in fluid communication with branch line 146, and may include one or more control valves 162 or of the flow control devices, to adjust an amount of solvent containing 161 wash water that is withdrawn from the emissions control section 114. Solvent containing wash water 161 from the emission control system 114 may be sent to a lean solvent make-up tank (not shown) or to the top of the absorption columns 100, or used within the overall system for removing contaminants from the flue gas.

A controller 164 may be in communication with one or more components described above. The controller 164 may be, for example, a general purpose computer, an application-specific integrated circuit, or a pneumatic, electric or mechanical controller. The controller 164 may be configured to automatically adjust one or more system parameters to control solvent emissions and maintain water neutrality in the wash water system 112 or the entire $CO_2$ removal system. For example, as shown in FIG. 1, the controller 164 may be in communication with the heat exchanger 144, the pump 142 or the flow control valves 148, 162. The system is not limited in this regard as the controller 164 may be in communication with other components.

In one embodiment, the controller 164 can be configured to adjust an amount of solvent, e.g., amine, that is recovered by the wash water system 112 by adjusting an amount of the water stream 122 that is brought into contact with decarbonated flue gas 120. For example, if the controller 164 determines that solvent emission or system solvent losses meet or exceed a predetermined threshold, the controller 164 may act to increase the amount of water stream 122 added to the emission control section 114.

In another embodiment, the controller 164 can also be configured to control water neutrality by adjusting a temperature of the wash water 132 brought into contact with the decarbonated flue gas 120 in the flue gas cooling section 116, thereby adjusting the amount of water removed from the reduced solvent containing flue gas 124. Water neutrality can also be controlled, for example, by assessing or determining the amount of water stream 122 added to the water wash section 112 (for water wash neutrality) or the entire $CO_2$ system (for system neutrality) and compared to the amount of water removed from the flue gas cooling section 116 (e.g., by pump 142 or branch line 146).

Depending on the comparison performed by the controller 164, the controller may increase or decrease the temperature of the wash water 132 (e.g., by adjusting the flow of the wash water to the heat exchanger 144) to adjust an amount of water removed from the reduced solvent containing flue gas 124, and thereby maintain water neutrality within a desired range. The controller 164 may be capable of measuring or determining a solvent concentration, collected in the absorption column 100, for example, and adjust the temperature of the wash water if the solvent concentration meets certain thresholds.

In another embodiment, the controller 164 may also control the amount of the used wash water 126 provided to branch line 146 by adjusting one or more of the flow control valve 148 or the pump 142.

The liquid distributor 156 of the emission control section 114 may comprise, for example, a manifold 166 with nozzles or the like to disperse the water stream 122 within the column, and a liquid distribution plate 168 or the like to further distribute the wash water within the column 100.

Figure 2:
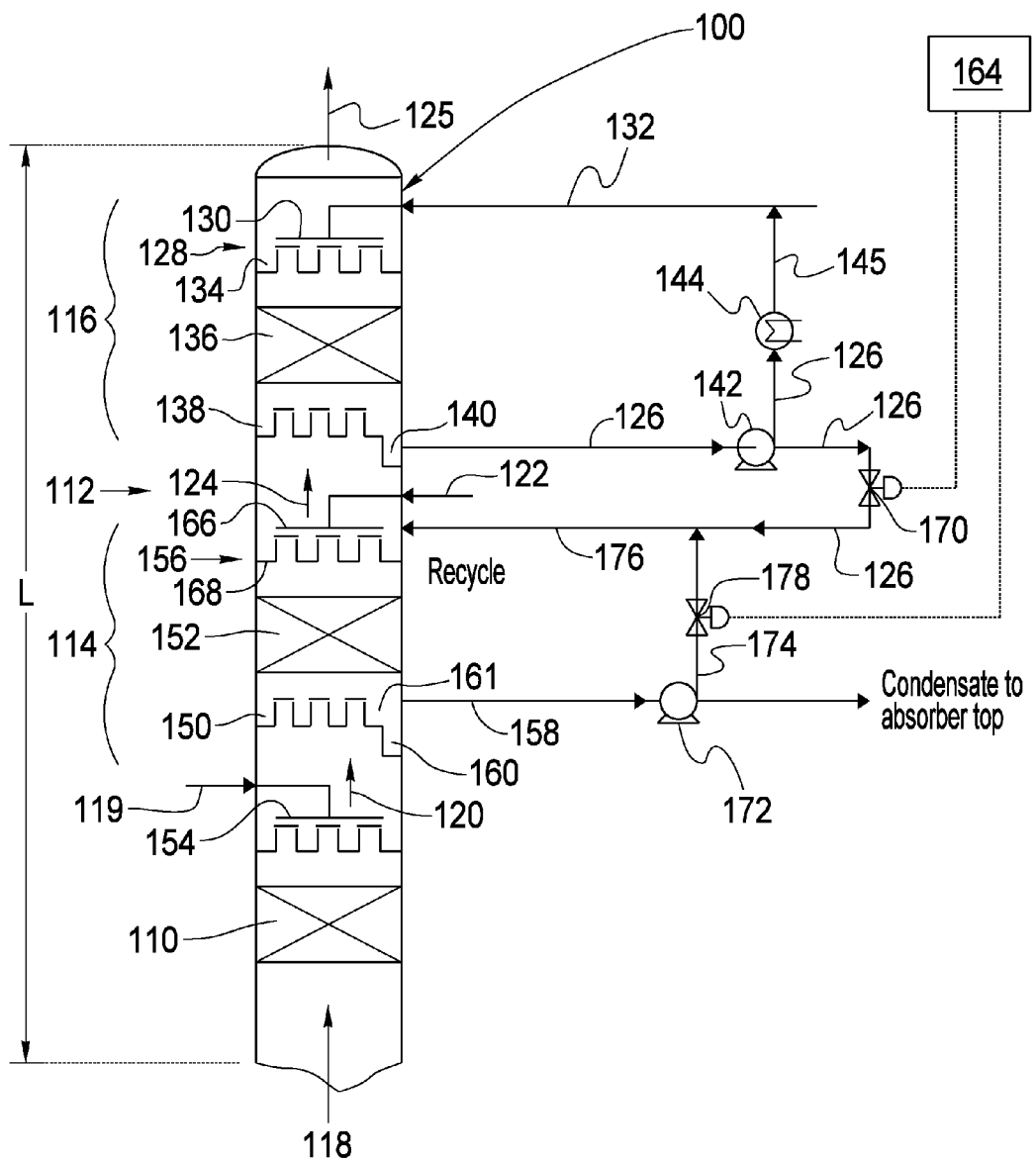
FIG. 2 depicts a $CO_2$-absorption column having a water wash section in accordance with an embodiment described herein.

In another embodiment, as shown in FIG. 2, the absorption column 100, which includes the wash section 112 and related components as described in detail above, is configured to recirculate at least a portion of the used wash water to the flue gas cooling section 116 and provide at least a portion of the withdrawn liquid to the emission control section 114.

As shown in FIG. 2, the sump 140 is in fluid communication with the pump 142. The pump 142 withdraws the used wash water 126 from the sump 140. After being withdrawn, at least a portion of the used wash water 126 is provided to the heat exchanger 144 as described in more detail above. Another portion of the used wash water 126 is provided to the emission control section 114.

The amount of used wash water 126 is provided to the emission control section 114 may be controlled by opening or closing a control valve 170 that is positioned between the flue gas cooling section 116 and the emission control section 114. Control valve 170 may be operated manually or automatically. Control valve 170 may be in communication with the controller 164, which may close or open control valve 170 based on information, readings, or signals concerning amounts of wash water provided to the emission control section 114 by other sources as described herein.

Since the reduced solvent containing flue gas 124 has very little to no solvent, the used wash water 126, which has contacted the flue gas 124, will have a very low concentration of solvent. Thus, the used wash water 126 may be recirculated for re-use in the flue gas cooling section 116 or provided to the emission control section 114. Re-use of the used wash water 126 may reduce the amount of fresh water provided to the absorption tower in the form of water stream 122 and wash water 132.

Increasing an amount of water provided to the emission control section 114 facilitates proper circulation and distribution of water that comes into countercurrent contact with the decarbonated flue gas 120. By maintaining proper circulation and distribution of water in the emission control section 114, the desired amount of solvent can be removed from the decarbonated flue gas 120. Maintenance or proper circulation of water in the emission control section 114 can be achieved by providing the used wash water 126 to the emission control section. These efforts do not increase the costs associated with providing fresh water, e.g., water stream 122, to the emission control section.

To further reduce the amount of the water stream 122 provided to the emission control section 114, at least a portion of the solvent containing wash water 161 withdrawn from sump 160 by a pump 172 into a branch line 158 may be recirculated and provided to the top of the emission control section.

As shown in FIG. 2, at least a portion of the solvent containing wash water 161 in branch line 158 is directed by line 174 to join with at least a portion of used wash water 126 to form a recycle liquid 176. Recycle liquid 176 is introduced to the top of the emission control section 114 via the manifold 166. Once introduced to the emission control section 114, the recycle liquid 176, along with water stream 122, descends at least a length L of the absorption tower 100, thereby absorbing the solvent from the decarbonated flue gas 120 to form flue gas 124.

The amount of the solvent containing wash water 161 provided to the emission control section 114 may be regulated by a control valve 178. As shown in FIG. 2, the control valve 178 is disposed in line 174, however, it is contemplated that the control valve 178 may be disposed in the branch line 158. The control valve 178 may be in communication with the controller 164, which may close or open the control valve 178 based on information, readings or signals concerning amounts of the wash water provided to the emission control section 114 by other sources described herein.

The foregoing embodiments are exemplified in the Examples included below, which are provided to exemplify certain aspects of the disclosed embodiments. The Examples are not provided to limit the embodiments in any manner.

EXAMPLES

Example 1

To illustrate the effectiveness of the system shown in FIG. 1, a simulation was run to show the impact on the solvent emissions as well as water neutrality. A flue gas with 90% of $CO_2$ removed from a ~260 Mwe (megawatt of electrical energy) lignite fired power plant was used in this simulation. It was assumed the required solvent emissions are ~2 parts per million by volume (ppmv). Based on the inlet flue gas conditions, the flue gas exit temperatures are calculated to be ~112 degrees Fahrenheit (° F.) in order to obtain water neutrality. The simulation included an amine-containing absorbing solution.

The tabulation below illustrates the impact of the system shown in FIG. 1 in comparison with the conventional method, i.e., having only one wash water bed. With the conventional method (case 1, below), if the circulation is adjusted to provide water neutrality by maintaining closer exit gas temperatures, the solvent emissions control is not achieved (9 ppmv vs 2 ppmv). On the other hand, if the circulation rates are adjusted to give ~7 ppmv solvent emissions (case 3), the exit temperatures does not satisfy the water neutrality constraints. Both solvent emission control and water neutrality are achieved in the system illustrated in FIG. 1.

TABLE 1

Comparison of conventional and new water wash scheme

| Case # | Cases type | Solvent Emissions, ppmv | Clean Flue Gas Exit Temperature, deg F. | Water Circulation Rate, Gpm |
|---|---|---|---|---|
| 1 | Conventional | 9.2 | 112.40 | 6100 |
| 2 | System of FIG. 1 | 2.0 | 111.75 | 6100 + 20 (makeup) |
| 3 | Conventional 2 | 7.1 | 98.85 | 8000 |

Example 2

To illustrate the effectiveness of the system shown in FIG. 2, a simulation was run to show the impact on the solvent emissions as well as water neutrality. The system of FIG. 2 was compared to a conventional system, i.e., having only one wash water bed as well as a system according to FIG. 1.

With the convention flow scheme (case 4, below), if the circulation is adjusted to provide water neutrality by maintaining closer exit flue gas temperatures, the solvent emissions control is not achieved (9 ppmv v. 2 ppmv). If the circulation rates are adjusted to give ~7 ppmv solvent emissions (case 5), the exit temperature of the flue gas does not satisfy the water neutrality constraints. While both emission control and water neutrality are achieved by utilizing a system according to FIG. 1 (case 6), solvent emission rates can be lowered further by utilizing a system according to FIG. 2 (case 7).

TABLE 2

Comparison of Conventional Systems to Systems Illustrated in FIGS. 1 and 2

| Case # | Case Type | Solvent Emissions, ppmv | Clean Flue Gas Exit Temperature, ° F. | Water Circulation Rate, Gpm |
|---|---|---|---|---|
| 4 | Conventional | 9.2 | 112.40 | 6100 |
| 5 | Conventional 2 | 7.1 | 98.85 | 8000 |
| 6 | System of FIG. 1 | 2.0 | 111.75 | 6100 + 20 (make up) |
| 7 | System of FIG. 2 | 0.46 | 111.70 | 6100 + 10 (make up) + 1800 (re-circulation) |

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for recovering a solvent from a decarbonated flue gas in a water wash section of an absorption column, the decarbonated flue gas having had carbon dioxide absorbed and removed by vapor-liquid contact with a carbon dioxide absorbing solution containing the solvent in the absorption column, the method comprising:
   bringing a water stream substantially free of the solvent into counter-current contact with the decarbonated flue gas in an emission control section of the absorption column to recover the solvent from the decarbonated flue gas to form a solvent containing wash water and a reduced solvent containing flue gas; and
   bringing a. cooled wash water into counter-current contact with the reduced solvent containing flue gas in a flue gas cooling section of the absorption column to cool the reduced solvent containing flue gas, thereby forming a cooled flue gas and a used wash water; and
   collecting the used wash water with a collection device disposed between the flue gas cooling section and the emission control section;

removing the collected used wash water from the collection device;
cooling at least a portion of the removed used wash water to form cooled wash water; and
returning at least a portion of the cooled wash water to the flue gas cooling section.

2. The method according to claim 1, wherein the solvent is an amine-containing solution.

3. The method according to claim 1, further comprising:
adjusting an amount of solvent absorbed by the wash water section by adjusting an amount of the water stream contacted with the decarbonated flue gas; and
adjusting an amount of water removed from the reduced solvent containing flue gas by adjusting a temperature of the cooled wash water contacted with the reduced solvent containing flue gas.

4. The method according to claim 1, further comprising:
adjusting the temperature within the emission control section so that the temperature difference of the flue gas between the entrance and the exit of the emission control section is minimal.

5. The method according to claim 1, further comprising:
adjusting the concentration gradient of solvent between the water stream and the decarbonated flue gas in the emission control section to reduce the water stream circulation rate to provide a minimal temperature difference of the flue gas between the entrance and the exit of the emission control section.

6. The method according to claim 1, wherein the solvent removed in the flue gas cooling section is minimal.

7. The method according to claim 1, further comprising;
adjusting an amount of used wash water removed from the flue gas cooling section by adjusting an amount of cooled wash water returned to the flue gas cooling section.

8. The method according to claim 7, further comprising;
adjusting an amount of water removed from the decarbonated flue gas in the flue gas cooling section by adjusting a temperature of the cooled wash water brought into contact with the reduced solvent containing flue gas.

9. The method according to claim 1, wherein the bringing of the water stream into countercurrent with the decarbonated flue gas further includes:
providing sufficient water stream to reduce the solvent in the flue gas to he substantially low when exiting the emission control section.

10. The method according to claim 9, wherein the bringing of the water stream into countercurrent with the decarbonated flue gas further includes:
providing the water stream at a temperature such that the temperature difference between the entrance and the exit of the emission control section is minimal.

11. The method according to claim 1, further comprising:
providing at least a portion of the removed used wash water to the emission control section.

12. The method according to claim 11, further comprising:
providing the at least a portion of the removed used wash water to a heat exchanger;
cooling the portion of the removed used wash water to form a cooled wash water; and
providing the cooled wash water to the flue gas cooling section.

13. The method according to claim 11, further comprising:
adjusting the concentration gradient of solvent between the water stream and the decarbonated flue gas in the emission control section by adjusting the flow rate of the at least portion of the removed used water to the emission control section.

14. The method according to claim 11, wherein the at least portion of the removed used wash water is provided to an upper portion of the emission control section.

15. The method according to claim 14, wherein the solvent removed in the flue gas cooling section is minimal.

16. The method according to claim 11, further comprising:
contacting the decarbonated flue gas with the removed used wash water and the water stream in a countercurrent manner in the emission to form a solvent containing wash water.

17. The method according to claim 16, further comprising:
collecting the solvent containing wash water in a collection device within the emission control section; and
reutilizing at least a portion of the solvent containing wash water in the emission control section.

18. The method according to claim 17, wherein the portion of the solvent containing wash water reutilized in the emission control section is combined with the used wash water from the flue gas cooling section; and
providing the combined solvent containing wash water and used wash water to the emission control section.

19. The method according to claim 17, further comprising:
providing at least a portion of the solvent containing wash water to an absorber bed in the absorption column.

20. A method for recovering a solvent from a decarbonated flue gas having had carbon dioxide absorbed and removed by vapor-liquid contact with a carbon dioxide absorbing solution containing the solvent, the method comprising:
bringing a water stream substantially free of the solvent into counter-current contact with the decarbonated flue gas to recover the solvent from the decarbonated flue gas to primarily form a solvent containing wash water and a reduced solvent containing flue gas; and
bringing a cooled wash water into counter-current contact with the reduced solvent containing flue gas to primarily cool the reduced solvent containing flue gas, thereby forming a cooled flue gas and a used wash water.

* * * * *